United States Patent [19]

Wright et al.

[11] Patent Number: 5,058,228

[45] Date of Patent: Oct. 22, 1991

[54] MACHINE AND METHODS FOR COLLATING WIRE NAILS HAVING SHANK KEYWAYS

[75] Inventors: Robert W. Wright, Buffalo Grove; William L. Gabriel, Barrington, both of Ill.; Donald E. Bergstrom, Bartlett, Tenn.; Reinhold Meditz, Lake Zurich; Henry A. Sygnator, Arlington Heights, both of Ill.

[73] Assignee: Illinois Tool Works Inc., Glenview, Ill.

[21] Appl. No.: 597,022

[22] Filed: Oct. 15, 1990

[51] Int. Cl.⁵ ............................................... B21G 3/32
[52] U.S. Cl. ..................................... 10/162 A; 10/169
[58] Field of Search ............. 10/162 A, 169; 198/394; 29/429, 430, 433

[56] References Cited

U.S. PATENT DOCUMENTS 4,711,980 12/1987 Leistner ........................... 198/394

FOREIGN PATENT DOCUMENTS 3041147 5/1981 Fed. Rep. of Germany ...... 198/394
0002551 1/1980 Japan ................................ 198/394

Primary Examiner—Lowell A. Larson
Assistant Examiner—Michael J. McKeon
Attorney, Agent, or Firm—Schwartz & Weinrieb

[57] ABSTRACT

Wire nails are collated by means for conveying the nails in a specified manner and by means comprising a wheel for engaging keyways defining flat surfaces on the shanks of the nails. Each nail is rotated by the wheel, about an axis of the shank of such nail, to such extent as may be then necessary to orient the keyways of such nail and of other nails with such surfaces defining a plane. The wheel fits between end surfaces defined by the keyways so as to cause the keyways that have been engaged by the wheel to define a continuous channel.

20 Claims, 2 Drawing Sheets

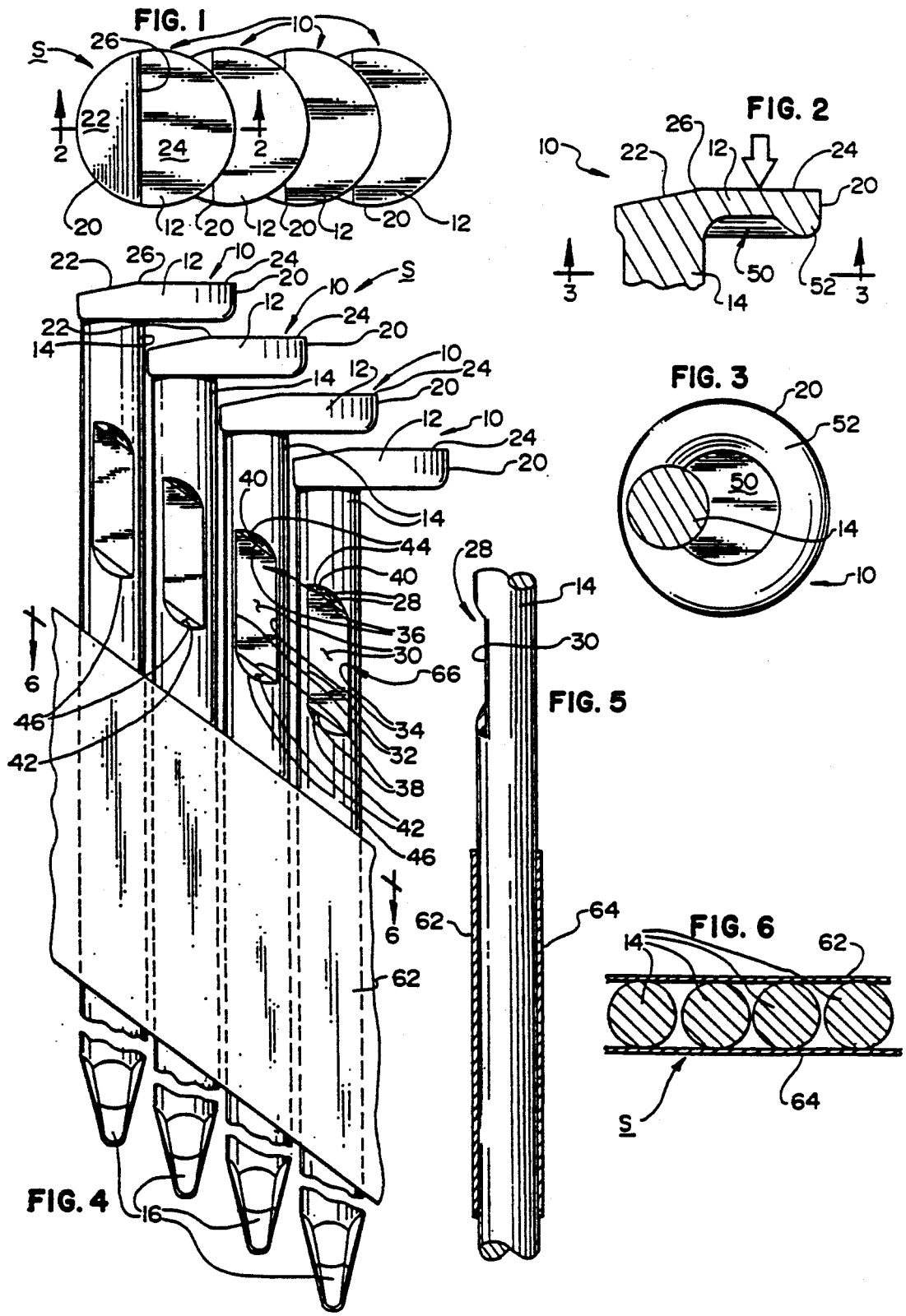

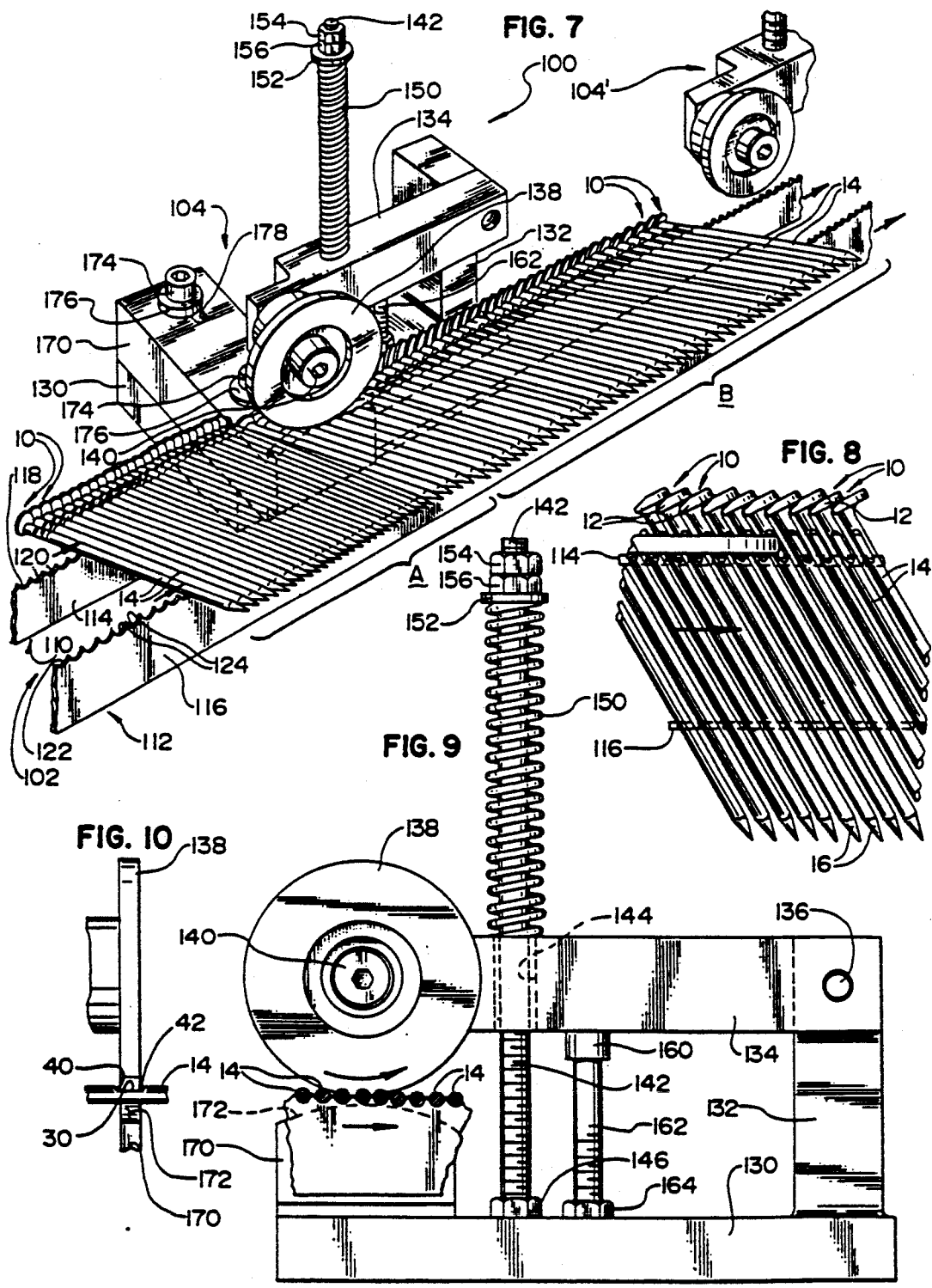

MACHINE AND METHODS FOR COLLATING WIRE NAILS HAVING SHANK KEYWAYS

TECHNICAL FIELD OF THE INVENTION

This invention pertains to a novel combination of mechanisms within a machine for collating wire nails having a novel configuration wherein the shank of each nail has a keyway. This invention pertains also to a novel method for collating such nails.

BACKGROUND OF THE INVENTION

Typically, as used within pneumatically powered or combustion-powered nail-driving tools, wire nails having D-shaped or variant heads are collated by means of adhesively applied tapes or other collating media so as to form a strip. The shanks of the collated nails are oriented in a closely spaced, parallel relationship with respect to one another and, except at one end of the strip, the head of each nail overlies the head of another nail.

Various strips of collated wire nails having D-shaped heads are exemplified in Lingle U.S. Pat. No. 3,152,334, Leistner U.S. Pat. No. 3,861,526, and Shelton et al. U.S. Pat. No. 3,966,042. Powers U.S. Pat. No. 3,359,582 discloses a die assembly for making a wire nail having such a head. Similar strips of collated wire nails having variant heads are exemplified in Juilfs U.S. Pat. No. 2,940,081 and Becht U.S. Pat. No. 3,481,459. None of the D-shaped or variant heads disclosed in the foregoing patents defines a complete circle when viewed axially.

In a known machine for collating wire nails, the nails are conveyed into a zone where adhesively applied tapes or other collating media are applied, by means of two endless bands having pockets holding the nail shanks. The endless bands are similar to bandsaw blades. The nail shanks are held in a closely spaced, parallel relationship with respect to one another and the nail tips tend to be generally aligned with one another, within a plane defined by means of the shank axes.

Desirably, the nail heads are oriented similarly and precisely, and the nail tips are aligned precisely with one another. In actual practice, it is difficult to orient the nails precisely in a rotational sense and in an axial sense when collating the nails. If a nail is not oriented precisely within a strip of collated nails, and if the strip is fed to a pneumatically powered or combustion-powered nail-driving tool, the nail may be damaged when driven. Furthermore, the tool and other nails within the strip may also be damaged.

A strip of collated wire nails wherein each nail has a novel configuration including a radially offset, circular head and a shank having a keyway, among other features, is disclosed in a copending application filed simultaneously herewith, under Ser. No. 597,025, and assigned commonly herewith. The copending application is entitled "Wire Nail, Strip of Collated Wire Nails, and Related Apparatus."

This invention makes advantageous use of the keyways of such nails so as to provide a novel combination of mechanisms within a machine for collating such nails and to provide a novel method for collating such nails.

SUMMARY OF THE INVENTION

This invention provides a novel combination of mechanisms within a machine for collating such nails. The novel combination comprises a nail-conveying mechanism, which is similar to the nail-conveying mechanism of a nail-collating machine known heretofore, and a keyway-engaging mechanism, which is novel.

The nail-conveying mechanism conveys the nails through an orienting zone. The nail shanks are disposed in a parallel relationship with respect to one another. The axes of the nail shanks define a plane. The nail tips tend to be generally aligned with one another.

The keyway-engaging mechanism is arranged for engaging the keyways as the nails are conveyed through the orienting zone. The keyway-engaging mechanism is arranged, moreover, for rotating each nail about its shank axis to such an extent as may then be necessary so as to cause its keyway and the keyways of the other nails conveyed through the orienting zone to be similarly oriented in a rotational sense. The keyway-engaging mechanism is disengaged from the keyways after engaging the keyways.

Preferably, the keyway of each nail defines a flat surface, which is engaged by means of the engaging mechanism as such nail is conveyed through the orienting zone. The engaging means engages the flat surface of the nail keyway in such a manner that the flat surfaces of the nails conveyed through the orienting zone define a plane. Thus, if the flat surface defined upon each nail is parallel to its shank axis, the plane defined by means of the flat surfaces is parallel to the plane defined by means of the shank axes.

Preferably, the engaging apparatus comprises a wheel, which freely rotatable about its axis. The wheel is movable toward and away from an operative position and is biased toward the operative position. In the operative position, the wheel is adapted to be removably disposed into the keyway of each nail and to engage the flat surface defined by means of such keyway. Also, a camming member may be provided for camming the shank of each nail toward the wheel in such a manner that such nail is rotatable upon the camming member, about the axis of the shank of such nail.

If each nail is similar to the preferred embodiment disclosed in the copending application noted above, the keyway of each nail defines two end surfaces intersecting the flat surface defined by means of such keyway, preferably at acute angles relative to the axis of the shank of each nail. Also, such flat surface may conform to a parallelogram having two longer edges and two shorter edges and defining two acute angles and two obtuse angles, whereupon each of the end surfaces is bounded partly by means of one of the shorter edges.

Hence, the engaging apparatus which may comprise the wheel noted above, may also be adapted to fit at least partially within the keyway of each nail and to engage one of the end surfaces defined by means of such keyway so as to cam the shank of each nail axially to such an extent as may then be necessary so as to cause the shank tip of such nail and the shank tips of the other nails conveyed through the orienting zone to be precisely aligned with one another in an axial sense.

This invention provides a novel method for collating such nails. The nails are conveyed through an orienting zone. The nails are oriented as they are conveyed through the orienting zone. The nails are oriented by engaging the keyway of each nail and by rotating each nail to such an extent as may then be necessary so as to cause the keyway of such nail and the keyways of the other nails conveyed through the orienting zone to be similarly oriented in a rotational sense.

If the keyway of the shank of each nail defines a flat surface, which is engaged during the engaging step, the rotating step may then be performed in such a manner that the flat surfaces engaged during the engaging step define a plane. As noted above, if the flat surface of each nail shank is parallel to the axis of the shank, the plane defined by means the flat surfaces of the nail shanks is parallel to the plane defined by means of the axes of the shanks of the nails.

If the keyway of the shank of each nail defines two end surfaces intersecting the flat surface defined by means of such keyway, the engaging step is performed in such a manner that the flat surface defined by means of such keyway is engaged between the end surface. One of the end surfaces can also be engaged by means of the engaging mechanism so as to cam the shank of each nail axially to such an extent as may then be necessary so as to cause the tip of the shank of such nail and the tips of the shanks of the other nails conveyed through the orienting zone to be precisely aligned with one another.

These and other objects, features, and advantages of this invention will become evident from the following description of a preferred embodiment of the novel combination provided by means of this invention, and by means of the following description of a preferred mode for carrying out the improved method provided by means of this invention, with reference to the accompanying drawings in which like reference characters designate like or corresponding parts throughout the several views, and wherein:

BRIEF DESCRIPTION OF THE DRAWINGS

FIG. 1 is a plan view of a portion of a strip of collated wire nails, which have been collated in a manner according to this invention.

FIG. 2, on a slightly enlarged scale compared to that of FIG. 1, is a sectional view taken through one of the wire nails, along line 2—2 of FIG. 1, in a direction indicated by means of the arrows.

FIG. 3 is a sectional view taken through the same nail, along 3—3 of FIG. 2, in a direction indicated by means of the arrows.

FIG. 4 is an elevational view of the strip shown in FIG. 1. Portions of the shanks of the wire nails, between the tips of such nails and two collating tapes, have been omitted.

FIG. 5 is a fragmentary, elevational view of one of the wire nails and the collating tapes, as taken from one side of the strip shown in FIGS. 1 and 4.

FIG. 6 is a sectional view taken through the strip, along line 6—6 of FIG. 4, in a direction indicated by means of the arrows.

FIG. 7, on a smaller scale, is a semi-diagrammatic, perspective view of a novel combination of nail-conveying and keyway-engaging mechanisms, within a machine for collating wire nails in a manner constituting a preferred mode for carrying out this invention.

FIG. 8 is a fragmentary, plan view of certain elements of the novel combination coacting with a group of such nails.

FIG. 9 is a fragmentary, elevational view of certain elements of the novel combination coacting with a group of such nails.

FIG. 10 is a fragmentary, end view of ceratin elements of the novel combination coacting with one such nail.

DETAILED DESCRIPTION OF PREFERRED EMBODIMENT AND OF PREFERRED MODE

A preferred embodiment of the improved combination provided by means of this invention and a preferred mode for carrying out the improved method provided by means of this invention are described below. It should be here understood that this invention is not limited to what is described below.

As mentioned above, a strip of collated wire nails wherein each nail has a novel configuration including a radially offset, circular head and a shank having a keyway, which is located between the head and a pointed tip of the shank, is disclosed in the copending application identified above. The disclosure of the copending application identified above is incorporated herein by reference.

A strip S of collated wire nails 10, each having the novel configuration noted above, is shown in FIGS. 1, 4, 5, and 6. The wire nails 10 are collated in a manner according to this invention.

An exemplary nail 10 is described below. The nail 10 has a unique head 12, by means of the nail 10 is distinguished from wire nails known heretofore, and other unique features.

The nail 10 has a shank 14 integral with the head 12. The shank 14 defines an axis and has a tip 16. Preferably, as shown, the tip 16 conforms to the unique tip disclosed in Sygnator U.S. Pat. No. 4,927,309, the disclosure of which is incorporated herein by reference. Alternatively, the shank 12 may have a conventional tip (not shown) having four facets.

The head 12 has a circumferential edge 20 conforming to a complete circle and defining an axis which is radially offset with respect to the axis of the shank 14. Thus, in other words, the head 12 is radially offset in one direction relative to the shank 14. The head 12 defines a complete circle when viewed axially.

The head 12, at a top portion, has two planar surfaces spaced from the shank 14, namely a first surface 22 and a second surface 24. The second surface 24 intersects the first surface 22 along a crest 26, which extends across the head 12, which has a small radius (approximately 0.093 inch) and which is shorter than a diameter of the complete circle defined by means of the circumferential edge 20 of the head 12. The first surface 22 is oriented at an obtuse, included angle of approximately 168° relative to the second surface 24 and the second surface 24 is oriented at a right angle relative to the axis of the shank 14.

The shank 14 is formed with a keyway 28 defining a flat surface 30, the plane of which is parallel to the axis of the shank 14 and to the direction of radial offset of the head 12 relative to the shank 14, and which is spaced axially from the head 12. The flat surface 30 conforms to a parallelogram having two longer, axially extending sides 32, 34, and two shorter, transversely extending sides 36, 38. These longer and shorter sides define two acute angles (such as, for example, approximately 34° each) and two obtuse angles (such as, for example, approximately 146° each) as shown.

The keyway 28 is bounded by means of two flat surfaces 40, 42, which respectively intersect the flat surface 30 at the shorter sides 36, 38. The flat surface 40 is bounded by means of the side 36 and by means of a curved edge 44 and is oriented at an acute angle about (such as, for example, approximately 45°) relative to the axis of the shank 14 and at an obtuse angle (such as, for example, approximately 135°) relative to the flat surface 30. The flat surface 42 is bounded by mean of the side 38 and by means of a curved edge 46 and is oriented at an acute angle (such as, for example, approximately, 45°) relative to the axis of the shank 14, at an obtuse angle (such as, for example, approximately, about 135°) relative to the flat surface 30, an a right angle relative to the flat surface 40.

The keyway 28 provides a datum for orienting the collated nails 10 with their shanks 14 disposed in a parallel relationship with respect to one and with their heads 12 offset in a common direction relative to their shanks 14.

Upon a lower or underside portion, the head 12 of the nail 10 has a cavity 50, which is bordered by means of an annular rib 52 except where the shank 14 adjoins the head 12. As contrasted with a head (not shown) that is planar at its lower or underside portion, the head 12 tends to be less prone to separating from the shank 14, particularly if the head 12 is struck at a localized region radially spaced from the shank 14, such as, for example, where suggested by means of the wide arrow in FIG. 2

At the annular rib 52, the lower or underside portion of the head 12 defines a tangent plane, which is oriented at a right angle relative to the axis of the head 12, and at a right angle relative to the shank 14.

As shown in FIGS. 4, 5, and 6, the collated nails 10 of the strip S are collated by means of conventional collating tapes 62, 64, applied adhesively to opposite sides of the shanks 14 of the collated nails 10, in parallel relation to the flat surfaces 30 defined by means of the keyways 28 upon the shanks 14 of the collated nails 10. The collating tapes 62, 64, are oriented at an acute angle (such as, for example, approximately 36°) relative to a plane normal to the axes of the shanks 14 of the collated nails 10.

The nails 10 in the strip S are collated in such a manner that their shanks 14 are oriented in a closely spaced, parallel relationship with respect to one another, whereby their shanks 14 may be nearly contiguous to one another. The nails 10 within the strip S are collated in such a manner that their heads 12 are offset in a common direction relative to their shanks 14 and in such a manner that, except at one end of the strip S (its right end in FIG. 3) where the nail 10 to be first or next driven is located, the head 12 of each nail 10 overlies the head 12 of another nail 10.

Collectively, as shown, the keyways 28 upon the shanks 14 of the collated nails 10 define an open channel 66, which extends along the strip S. As disclosed in the copending application noted above, the open channel 66 is useful in guiding the strip S through a nail-feeding magazine (not shown) to a pneumatically powered or combustion-powered nail-driving tool (not shown) of a known type.

As shown in FIGS. 7, 8, and 9, the nails 10 are collated in a machine 100 comprising a preferred embodiment of a novel combination of a nail-conveying mechanism 102 and a keyway-engaging mechanism 104.

The nail-conveying mechanism 102 is similar to the nail-conveying mechanism of a nail-collating machine known heretofore. The nail-conveying mechanism 102 comprises two endless bands 110, 112, which are similar to bandsaw blades, and which have respective portions 114, 116, movable in a parallel relationship with respect to each other the band 110 has an upper edge 118, which is formed with nail shank-receiving pockets 120. The endless band 112 has an upper edge 122, which is formed with nail shank-receiving pockets 124.

In the machine 100, as in a nail-collating machine known heretofore, the nails 10 are loaded onto the band portions 114, 116, in such a manner that the shank 14 of each nail 10 rests within one of the pockets 120 of the band portion 114 and within one of the pockets 124 of the band portion 116, at a desired angle (such as, for example, approximately 56°) relative to each of the band portions 114, 116, as shown in plan view in FIG. 8. Thus, the shanks 14 are disposed a closely spaced, parallel relationship with respect to one another. Also, the axes of the shanks 14 define a plane, which may be substantially horizontal, as shown.

Moreover, the tips 16 of the shanks 14 of the nails 10 tend to be generally aligned with respect to one another. However, as indicated by means of the bracket A in FIG. 7, the tips 16 may prove to be significantly misaligned with respect to each other. As explained above, it is undesirable for the tips 16 to be so significantly misaligned with respect to each other as explained above, it is undesirable for the tips 16 to be so significantly misaligned.

The keyway-engaging mechanism 104 comprises a base 130, a pedestal 132 welded to the base 130, an arm 134 mounted upon the pedestal 132 so as to be pivotally movable about a pin 136, and a wheel 138 mounted upon the arm 134 so as to be freely rotatable about a spindle 140. The pin 136 is mounted upon the pedestal 132, above the base 130. The spindle 140 is mounted upon the arm 134, remote from the pin 136.

A threaded stud 142 is threaded into a threaded socket (not shown) defined within the base 130, extends freely through an aperture 144 extending through the arm 134, and is secured to the base 130 by means of a threaded nut 146. A coiled spring 150 is disposed around the threaded stud 142, between the arm 134 and a washer 152 disposed upon the distal end of the threaded stud 142. The washer 152 and the coiled spring 150 are retained upon the threaded stud 142 by means of two threaded nuts 154, 156, which are threaded onto the threaded stud 142 in such a manner that the coiled spring 150 is compressed between the washer 152 and the arm 134. Thus, the coiled spring 150 biases the arm 134 in a counterclockwise sense, as shown, so as to bias the wheel 138 downwardly toward an operative position.

An adjustable stop 160 having a threaded shank 162 is threaded into a threaded socket (not shown) defined within the base 130 to a desired depth, which is adjustable so as to accommodate nail shanks of different dimensions, and is secured to the base 130 by means of a threaded unit 164. The adjustable stop 160 limits pivotal movement of the arm 134 in a counterclockwise sense, as shown, so as to limit downward movement of the wheel 138 toward its operative position.

A camming member 170 having a camming surface 172 is mounted upon the base 130 by means of two fasteners 174 (See FIG. 7) having threaded shanks (not shown) each passing through a washer 176, through an elongate slot 178 (one shown) defined within the camming member 170, and into a threaded socket (not shown) defined with base 130. The camming member 170 is disposed near the band portion 114 so that the camming surface 172 is adapted to cam the shank 14 of each nail 10 out of the pockets 120, toward the wheel 138, in such a manner that such nail 10 is rotatable upon the camming surface 172, about the axis of the shank 14 of such nail 10. It is contemplated that a similar camming member (not shown) may also be disposed near the band portion 116.

In its operative position, the wheel 138 is adapted to fit into the keyway 28 of each nail 10 and to engage the flat surface 30 defined by means of such keyway 28, between the end surfaces 40, 42, defined thereby. As each nail 10 is conveyed through an orienting zone, in which the wheel 138 coacts with the camming member 170, the wheel 138 engages the shank 14 of such nail 10 whereupon the wheel 138 may roll upon such shank 14 in such a manner that the arm 134 is pivoted slightly in a clockwise sense, as shown.

Thereupon, the wheel 138 rotates such nail 10 upon the camming surface 172 of the camming member 170, about the axis of the shank 14 of such an nail 10, to such extent as may then be necessary to cause the keyway 28 of such nail 10 and the keyways 28 of the other nails 10 conveyed through the orienting zone to be similarly oriented in a rotational sense. Preferably, as shown, the flat surfaces 30 of such keyways 28 define a plane, which faces upwardly and is parallel to the plane defined by means of the axes of the shanks 14.

The stop 160 is adjusted so as to limit pivotal movement of the arm 134, as biased downwardly by means of the coiled spring 150, to a selected limit. The limit is selected so that the wheel 138 is tangent to the flat surface 30 of the nail 10 being engaged by means of the wheel 138 which in turn engages the crest of the surface 172 when such surface 30 is parallel to the plane defined by means of the axes of the shanks 14. Thus, when the selected limit is reached, the wheel 138 cannot rotate each nail 10 beyond a rotated position where the flat surface 30 of the keyway 28 of such nail 10 faces upwardly and coincides with the tangent plane defined by means of those surfaces 30.

In its operative position, the wheel 138 is adapted to fit between the end surfaces 40, 42, defined by means of the keyway 28 of each nail 10. Moreover, the wheel 138 is adapted to bear against one of those surfaces 40, 42, as such nail 10 is conveyed through the orienting zone, so as to cam the shank 14 of such nail 10 axially to such an extent as may then be necessary for the tip 16 of the shank 14 of such nail 10 and the tips 16 of the shanks 14 of the other nails 10 conveyed through the orienting zone to be precisely aligned, as indicated by means of the bracket B in FIG. 7. In most if not all instances, if the wheel 138 engages one of those surfaces 40, 42, the wheel 138 engages the surface 40 nearer to the head 12 of the nail 10.

As shown fragmentarily in FIG. 7, a keyway-engaging mechanism 104' similar to the keyway-engaging mechanism 104 may also be provided within the machine 100, at a location close to the location (not shown) where two collating tapes, such as, for example, the collating tapes 62, 64, shown in FIG. 6, or other collating media (not shown) are applied in a known manner. The keyway-engaging mechanism 104' corrects for such minor misorientation of each nail 10, either in a rotational sense or in an axial sense, as may be due to vibrations of the endless bands 110, 112, or to similar causes.

Accordingly, in a preferred mode for carrying out the novel method provided by means of this invention through means of the machine 100, the nails 10 are conveyed through the orienting zone in such a manner that the, shanks 14 are disposed in a closely spaced, parallel relationship with respect to one another. Moreover, the axes of the shanks 14 define a plane, and the tips 16 tend to be generally aligned with respect to one another.

Additionally, the nails 10 are oriented as the nails 10 are conveyed through the orienting zone by employing the wheel 138 to engage the flat surface 30 defined by means of the keyway 28 of each nail 10, between the end surfaces 40, 42, defined by means of such keyway 28. The wheel 138 rotates such an nail 10 to such extent as may then be necessary to cause such flat surface 30 and the flat surfaces 30 defined by means of the keyways 28 of the other nails 10 conveyed through the orienting zone to be similarly oriented in a rotational sense and to define a plane, which is disposed parallel to the plane defined by means of the axes of the shanks 14 of the nails 10. The wheel 138 can engage one of the end surfaces 40, 42, defined thereby so as to cam the shank 14 of such nail 10 axially to such an extent as may then be necessary so as to cause the tip 16 of the shank 14 of each nail 10 and the tips 16 of the shanks 14 of the other nails 10 conveyed through the orienting zone to be precisely aligned with respect to one another in an axial sense. Thus, the nails 10 conveyed through the orienting zone are aligned similarly with respect to one another in an axial sense.

Herein, all references to precise alignment are subject to normal tolerances involved in nail manufacture, and to normal tolerances involved in machine design and machine operation.

Various modifications may be made in the novel combination described above, and in the novel method described above, without departing from the scope and spirit of this invention. It is therefore to be understood that within the scope of the appended claims, the present invention may be practiced otherwise than as specifically described herein.

We claim:

1. In a machine for collating similar wire nails wherein each nail has a head and a shank, and wherein said shank has a longitudinal axis, a tip spaced axially from said head, and a keyway located between said head and said tip upon a predetermined peripheral portion of said shank, a combination comprising:

conveying means for conveying said nails through an orienting zone in such a manner that said shanks of said nails are disposed in parallel relation with respect to one another, that the axes of said shanks of said nails define a plane, and that said tips of said shanks of said nails tend to be generally aligned with respect to one another; and rotary engaging means for rotatably engaging said keyways as said nails are conveyed through said orienting zone and for rotating each nail about the axis of said shank of such nail to such an extent as may be necessary so as to cause the keyway of the shank of such nail and said keyways of said shanks of the other nails conveyed through said oriented zone to be similarly oriented in a rotational sense about said longitudinal axes of said shanks, said engaging means being disengage from said keyways after engaging said keyways.

2. The combination of claim 1 wherein the keyway of the shank of each nail defines a flat surface, which is engaged by the engaging means as such nail is conveyed through the orienting zone, and wherein the engaging means engages the flat surface in such a manner that the flat surfaces engaged by the engaging means define a plane.

3. The combination of claim 1 wherein the keyway of the shank of each nail defines a flat surface parallel to the axis of the shank of such nail and wherein the engaging means engages the flat surface in such a manner that said flat surfaces engaged by the engaging means define a plane parallel to the plane defined by the axes of the shanks of the nails.

4. The combination of claim 3 wherein the engaging means comprises a wheel, which is adapted to fit removably into the keyway of the shank of each nail and to engage said flat surface defined by the keyway of the shank of such nail.

5. The combination of claim 4 comprising means for camming at least part of the shank of each nail toward the wheel, as such nail is conveyed past the wheel, in such a manner that such nail can be individually rotated, on the camming means, about the axis of the shank of such nail.

6. The combination of claim 1 wherein the keyway of the shank of each nail defines a flat surface parallel to the axis of the shank of such nail and two end surfaces intersecting the flat surface, wherein the engaging means engages the flat surface of the keyway of the shank of each nail, as such nail is conveyed through the orienting zone, in such a manner that said flat surfaces engaged by the engaging means define a plane parallel to the plane defined by the axes of the shanks of the nails, and wherein the engaging means is adapted to fit between the end surfaces of the keyway of the shank of each nail, as such nail is conveyed through the orienting zone, in such a manner that the keyways engaged by the engaging means define a continuous channel along the shanks of the nails conveyed through the orienting zone, whereby the nails conveyed through the orienting zone tend to be similarly oriented in an axial sense.

7. The combination of claim 6 wherein the engaging means comprises a wheel having an axis, the wheel being freely rotatable about the axis of the wheel, the wheel being movable toward and away from an operative position and being biased toward the operative position, and wherein the wheel in the operative position is adapted to fit between the end surfaces defined by the keyway of the shank of each nail and to engage one of the end surfaces, defined thereby so as to cam the shank of such an nail axially to such extent as may be necessary to cause the tip of the shank of such nail and the tips of the shanks of the other nails conveyed through the orienting zone to be precisely aligned with respect to one another in an axial sense.

8. The combination of claim 7 comprising means for camming the shank of each nail toward the wheel in such a manner that such nail is rotatable on the camming means, about the axis of the shank of such nail.

9. The combination of claim 6 wherein the end surfaces defined by the keyway of the shank of each nail intersect the flat surface defined thereby at obtuse angles.

10. The combination of claim 9 wherein the flat surface defined by the keyways of the shank of each nail conforms to a parallelogram having two longer edges and two shorter edges and defining two acute angles and two obtuse angles and wherein the end surfaces of the keyway of the shank of such nail are bounded partly by the shorter edges.

11. A method for collating similar wire nails wherein each nail has a head and a shank, wherein said shank has a longitudinal axis, a tip spaced axially from said head, and a keyway located between said head and said tip, comprising the steps of:
conveying said nails through an orienting zone in such a manner that said shanks of said nails are disposed in parallel relation with respect to one another, that the axes of said shanks of said nails define a plane, and that said tips of said shanks of said nails tend to be generally aligned with respect to one another; and
orienting said nails as said nails are conveyed through said orienting zone by rotatably engaging said keyway of said shank of each nail with rotary engaging means so as to rotate such nail to such an extent as may be necessary in order to cause said keyway of said shank of such nail and the keyways of said shanks of the other nails conveyed through said orienting zone to be similarly oriented in a rotational sense about said axes of said nails.

12. The method of claim 11, wherein:
the keyway of the shank of each nail defines a flat surface which is rotatably engaged by said rotary engaging means as such nail is conveyed through said orienting zone; and wherein
said rotation of each nail is performed in such a manner that said flat surfaces engaged by said rotary engaging means define a plane.

13. The method of claim 11, wherein:
the keyway of the shank of each nail defines a flat surface disposed parallel to the axis of the shank of such nail;
said flat surface is rotatably engaged by said rotary engaging means as such nail is conveyed through said orienting zone; and
said rotation of each nail is performed in such a manner that said flat surfaces rotatably engaged by said rotary engaging means defined a plane disposed parallel to said plane defined by said axes of said shanks of said nails.

14. The method of claim 13, wherein:
the keyway of the shank of each nail defines two end surfaces intersecting said flat surface defined by said keyway thereof; and
said rotatable engagement of said keyway of said shank of each nail is performed in such a manner that the flat surface defined by the keyway thereof is rotatably engaged by said rotary engaging means between said end surfaces and that one of said end surfaces defined thereby can also be engaged so as to cam the shank of such nail axially to such an extent as may be necessary so as to cause the tip of the shank of such nail and the tips of the shanks of the other nails conveyed through said orienting zone to be precisely aligned with respect to one another in an axial sense.

15. The combination as set forth in claim 7, further comprising:
support means pivotably supporting said wheel;
biasing means mounted upon said support means and engaged with an arm pivotably mounting said wheel upon said support means; and
stop means mounted upon said support means for limiting pivotably movement of said wheel arm to a predetermined degree so as to properly locate said wheel relative to said nail shanks.

16. The combination as set forth in claim 15, wherein:
said biasing means comprises a coil spring.

17. The combination as set forth in claim 1, wherein:

said conveying means comprises a pair of endless bands which are spaced with respect to each other so as to engage axially spaced portions of each of said nail shanks.

18. The combination as set forth in claim 17, wherein: each of said nail shanks is mounted upon said pair of bands at an acute angle with respect to the longitudinal extent of each of said bands.

19. The combination as set forth in claim 18, wherein: said acute angle is approximately 56°.

20. The combination as set forth in claim 17, wherein: each of said conveying bands comprises a plurality of teeth defining a plurality of pockets within which said shanks of said nails are conveyably disposed.

* * * * *